US011050225B2

(12) United States Patent
Santos

(10) Patent No.: US 11,050,225 B2
(45) Date of Patent: Jun. 29, 2021

(54) STRAIN RELEASE CONNECTOR FOR AN OVERHEAD ELECTRICAL WIRE

(71) Applicant: Carlos M. Santos, Richmond Hill, GA (US)

(72) Inventor: Carlos M. Santos, Richmond Hill, GA (US)

( * ) Notice: Subject to any disclaimer, the term of this patent is extended or adjusted under 35 U.S.C. 154(b) by 606 days.

(21) Appl. No.: 15/876,914

(22) Filed: Jan. 22, 2018

(65) Prior Publication Data

US 2018/0145489 A1 May 24, 2018

Related U.S. Application Data

(60) Continuation-in-part of application No. 15/418,972, filed on Jan. 30, 2017, now Pat. No. 10,109,992, which is a division of application No. 14/546,575, filed on Nov. 18, 2014, now Pat. No. 9,601,910.

(60) Provisional application No. 61/905,696, filed on Nov. 18, 2013.

(51) Int. Cl.
*H02G 3/04* (2006.01)
*H02G 7/20* (2006.01)
*H02G 7/02* (2006.01)

(52) U.S. Cl.
CPC ............. *H02G 3/0406* (2013.01); *H02G 7/02* (2013.01); *H02G 7/205* (2013.01); *Y10T 29/49826* (2015.01)

(58) Field of Classification Search
CPC ......... H02G 3/0406; H02G 7/02; H02G 7/205
See application file for complete search history.

(56) References Cited

U.S. PATENT DOCUMENTS

| 1,929,553 | A | * | 10/1933 | Hawley | H02G 7/053 |
| | | | | | 248/64 |
| 2,907,812 | A | * | 10/1959 | Sorflaten | H01R 11/14 |
| | | | | | 174/44 |
| 2,984,441 | A | * | 5/1961 | Dalmasso | H02G 7/14 |
| | | | | | 248/63 |
| 3,465,092 | A | | 9/1969 | Schwartz | |
| 4,014,504 | A | * | 3/1977 | Sachs | H02G 7/08 |
| | | | | | 248/61 |
| 4,156,103 | A | | 5/1979 | Dola | |
| 4,526,428 | A | * | 7/1985 | Sachs | H02G 7/053 |
| | | | | | 24/115 R |
| 5,055,056 | A | * | 10/1991 | Auclair | H01R 4/646 |
| | | | | | 248/61 |
| 9,318,885 | B2 | | 4/2016 | Schumacher | |
| 9,601,910 | B2 | * | 3/2017 | Santos | H02G 3/0493 |
| 10,673,215 | B2 | * | 6/2020 | Matsuo | F16B 2/065 |
| 2007/0044809 | A1 | | 3/2007 | Flynn | |

(Continued)

*Primary Examiner* — Anita M King
(74) *Attorney, Agent, or Firm* — Nixon & Vanderhye P.C.

(57) ABSTRACT

A strain release connector for an overhead electrical wire includes a first connector part securable to the overhead electrical wire with a fixed clamping force, and a second connector part cooperable with the first connector part and securable to a service cable with an adjustable clamping force, less than the fixed clamping force. The second connector part has at least one strain adjustment screw for modifying the adjustable clamping force. The adjustable clamping force is set by the at least one strain adjustment screw such that the second connector part is configured to release the service cable upon an application of a predetermined tension force.

13 Claims, 5 Drawing Sheets

(56) References Cited

U.S. PATENT DOCUMENTS

2015/0136915 A1* 5/2015 Santos .................... H02G 7/02
248/49
2020/0403390 A1* 12/2020 Jette ..................... H02G 3/0406

* cited by examiner

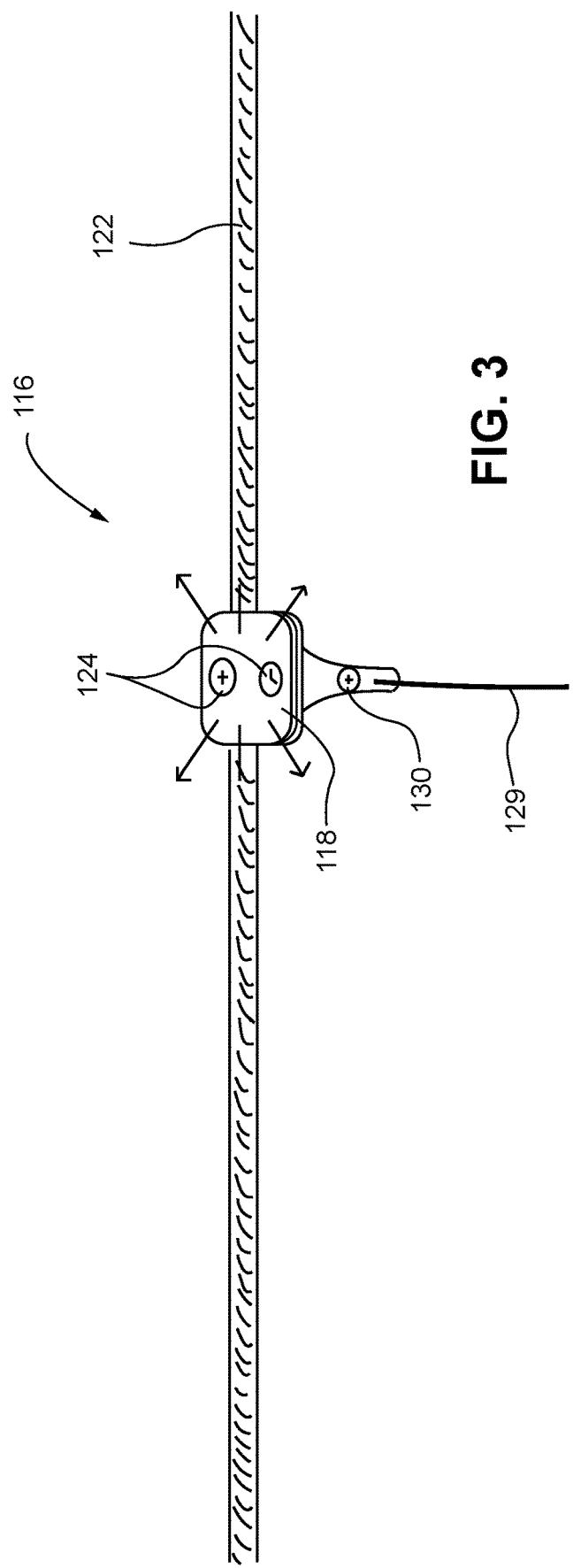

STRAIN RELEASE CONNECTOR FOR AN OVERHEAD ELECTRICAL WIRE

CROSS-REFERENCES TO RELATED APPLICATIONS

This application is a continuation-in-part of U.S. patent application Ser. No. 15/418,972 filed Jan. 30, 2017, which is a divisional of U.S. patent application Ser. No. 14/546,575 filed Nov. 18, 2014, now U.S. Pat. No. 9,601,910, which claims the benefit of U.S. Provisional Patent Application No. 61/905,696, filed Nov. 18, 2013, the entire contents of each of which are hereby incorporated by reference in this application.

STATEMENT REGARDING FEDERALLY SPONSORED RESEARCH OR DEVELOPMENT (NOT APPLICABLE)

BACKGROUND

The invention relates to a releasable connector for an overhead electrical wire and, more particularly, to a releasable connector assembly including strain adjustment screws that provide for controlled breakage (conductive separation) of an overhead electrical wire upon an application of a predetermined tension force.

Downed power lines can carry an electric current strong enough to cause serious injury or death. Downed power lines can result from various causes including fallen trees during a storm, high winds, car accidents into utility poles, and the like. It is also possible for wire tension to cause utility pole breakage, resulting in multiple downed power lines.

BRIEF SUMMARY

It would be desirable to prevent the dangers associated with downed power lines.

A strain release connector according to the described embodiments serves as a release point in the event of increased tension on an overhead electrical wire where the strained wire will pull away from the torqued side of the connector and fall to the ground de-energized, leaving the other side of the wire that is crimped into the connector, intact overhead and energized. The connectors also serve to reduce the potential for pole breakage, reduce the potential for service masts to be pulled away from homes and buildings, accommodate more services per takeoff location than conventional crimping in crowded areas, isolate high hazard areas from the risks of downed energized wires, and lessen the hazards caused by dig-ins. No break-away devices presently exist in electric utility infrastructure, and these devices have widespread and versatile applications throughout their aerial and underground networks from transmission to service voltages.

In an exemplary embodiment, a strain release connector for an overhead electrical wire includes a first connector part securable to the overhead electrical wire with a fixed clamping force, and a second connector part cooperable with the first connector part and securable to a service cable with an adjustable clamping force, less than the fixed clamping force. The second connector part has at least one strain adjustment screw for modifying the adjustable clamping force. The adjustable clamping force is set by the at least one strain adjustment screw such that the second connector part is configured to release the service cable upon an application of a predetermined tension force.

The first connector part may include a two-piece block that sandwiches the overhead electrical wire. The two-piece block may be secured by connectors. The second connector part may be formed along at least part of a perimeter of the two-piece block, where the second connector part may include a plurality of strain adjustment screws respectively securing a corresponding plurality of service cables. Each of the pieces of the two-piece block may include a groove, where the grooves may be oriented in facing alignment to define an elongated channel. In this context, the overhead electrical wire may be securable in the elongated channel. The second connector part further may include a plurality of service ports with wire ends thereof releasably coupled with the two-piece block and secured by the plurality of strain adjustment screws in direct contact compression on the wire ends.

The first connector part may include a two-piece block that sandwiches the overhead electrical wire, where the two-piece block may be secured by connectors. The second connector part may be formed along at least part of a perimeter of the two-piece block, where the second connector part may include a single strain adjustment screw securing a corresponding single service cable.

In some embodiments, the first connector part and the second connector part may be integrated in opposite ends of a conductor sleeve. In this context, the first connector part may be configured to receive the overhead electrical wire and may include a crimp section for locking the overhead electrical wire therein. The second connector part may be configured to receive and releasably secure the service cable with the strain adjustment screw.

In another exemplary embodiment, an overhead electrical wire assembly includes an electrical pole; an electric wire secured to the pole; a service cable connected with the electric wire and coupleable with a service location; and the strain release connector connected between the electric wire and the service cable.

In a preferred construction, when the service cable is released upon the application of the predetermined tension force, current in the service cable is disconnected.

With the conductor sleeve, placement of the strain release connector relative to the electrical pole is such that when the service cable is released upon the application of the predetermined tension force, the electric wire is not ground accessible and is short enough to prevent contact with other grounded or energized pole attachments.

In yet another exemplary embodiment, a method of releasably connecting an overhead electrical wire includes the steps of cutting the wire to define a line side wire and a load side wire; securing a first connector part to the line side wire by crimping; securing a second connector part, cooperable with the first connector part, to the load side wire with an adjustable clamping force, the second connector part including at least one strain adjustment screw; and adjusting the adjustable clamping force with the at least one strain adjustment screw such that the second connector part is configured to release the load side wire upon an application of a predetermined tension force.

BRIEF DESCRIPTION OF THE DRAWINGS

These and other aspects and advantages will be described in detail with reference to the accompanying drawings, in which:

FIG. 3 shows a single service drop strain release connector;

DETAILED DESCRIPTION

Figure 1:
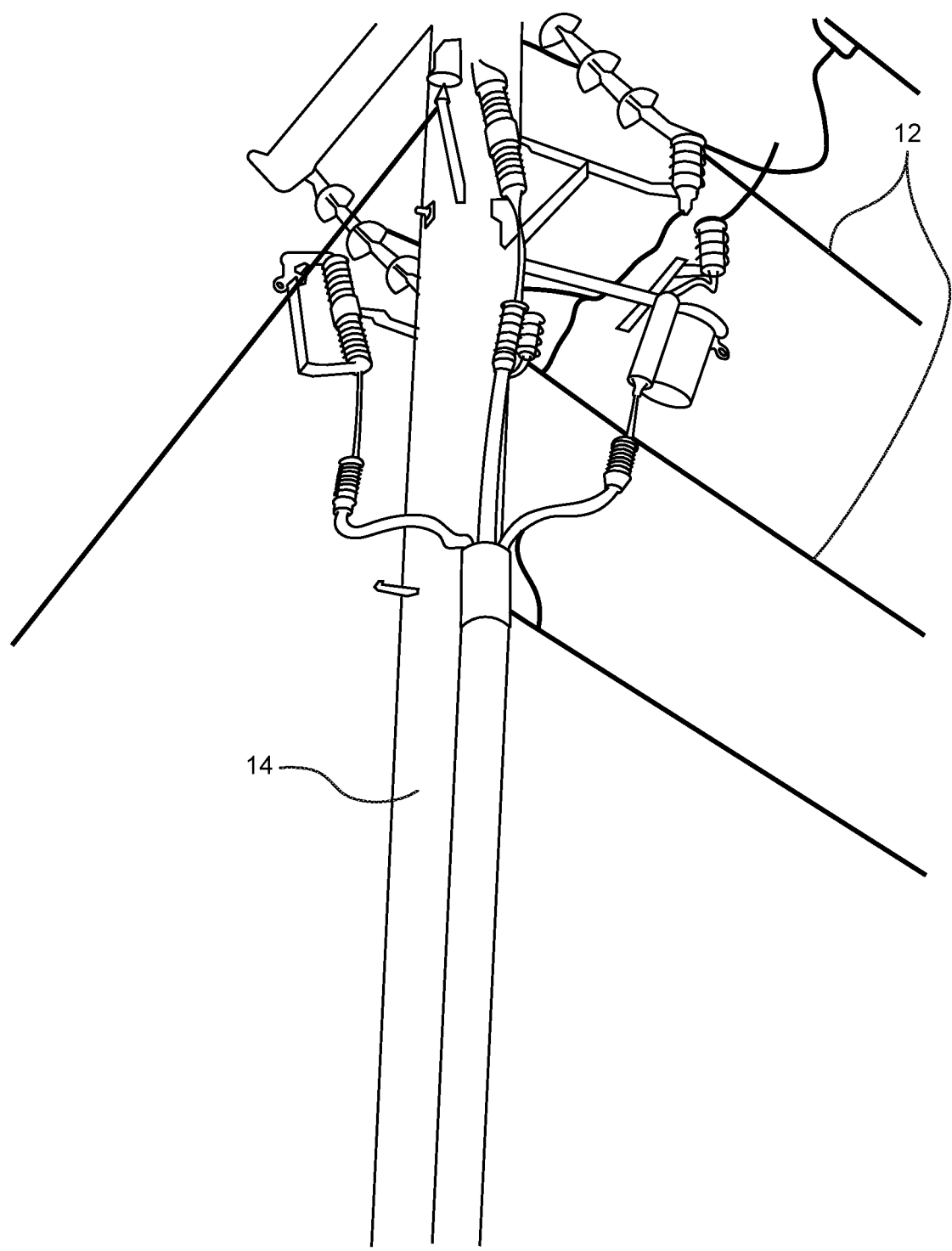
FIG. 1 shows an exemplary utility pole supporting overhead power lines.

FIG. 1 shows exemplary overhead power lines 12 attached to a utility pole 14. With existing power line assemblies, the overhead electrical wires 12 are susceptible to breakage due to storms and the like, resulting in hazardous downed power lines.

Figure 2A:
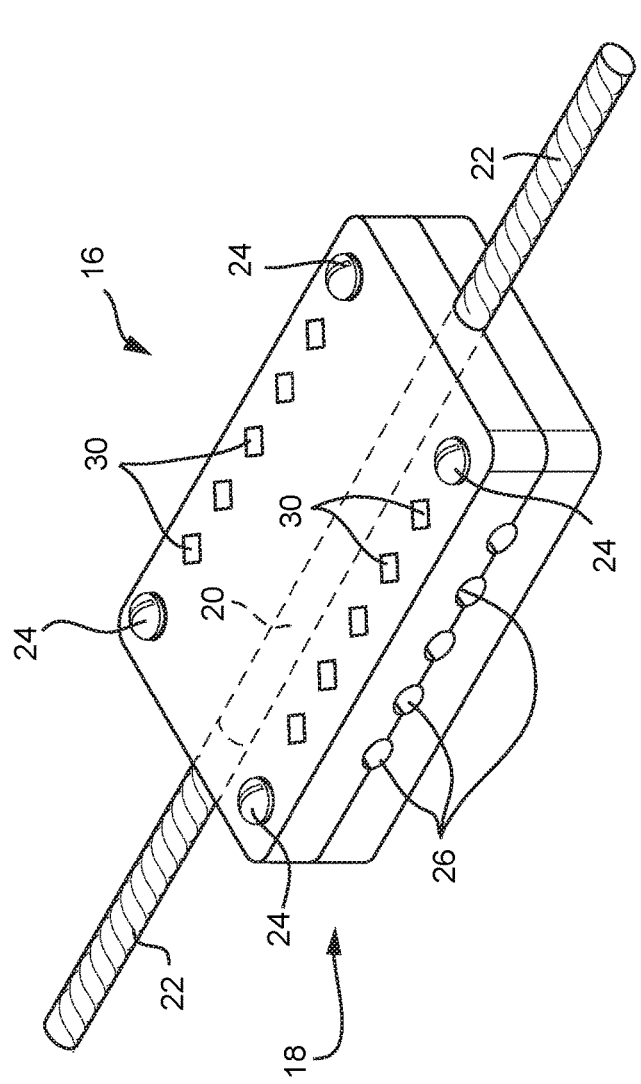
FIGS. 2A and 2B show a strain release connector with multiple service drops for a plurality of homes/buildings.
Figure 2B:
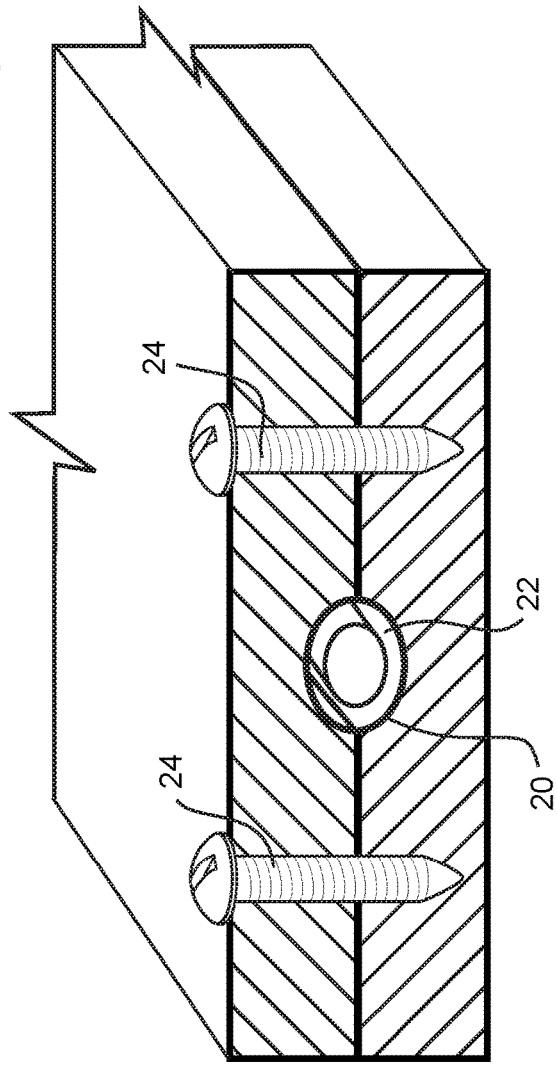

FIGS. 2A and 2B show an exemplary strain release connector 16 for an overhead electrical wire that serves as a controlled release point in the event that the electrical wires are subjected to an application of a predetermined tension force. The strain release connector 16 includes a block assembly 18, preferably constructed in two parts (e.g., an upper part and a lower part). The block 18 includes an elongated wire/messenger channel 20 that receives an overhead electrical wire/messenger cable 22. In the exemplary embodiment shown in FIGS. 2A and 2B, the two-piece block 18 sandwiches the overhead electrical wire/messenger cable 22. Each of the pieces of the two-piece block 18 includes a groove oriented in facing alignment to define the elongated channel 20 in which the overhead electrical wire/messenger cable 22 may be secured. The block 18 is clamped together over the messenger cable 22 via suitable connectors 24 such as screws or the like. The block 18 serves as a first connector part securable to the overhead electrical wire/messenger cable 22 with a fixed clamping force.

A plurality of service ports 26 are defined by cavities in the side of the block 18. In the embodiment shown in FIGS. 2A and 2B, the strain release connector 16 provides service for multiple homes/buildings (ten (10) total service ports 26 are included in the block 18 shown in FIG. 2A). Perpendicular to and in line from above each service port is a strain adjustment screw 30 in direct contact with the cable that is inserted in the service port 26 as an adjustable holding force on the cable. The strain adjustment screws 30 serve to adjust a clamping force on the service wires (via the service ports 26 in FIG. 2A). The strain adjustment screws 30 set an adjustable clamping force that is less than the fixed clamping force on the overhead electrical wire/messenger cable 22 so that the block 18 is configured to release wires secured in the service ports 26 and thereby release the respective service cables upon an application of a predetermined tension force on the service cables. The service ports 26 and the strain adjustment screws 30 define a second connector part that is cooperable with the first connector part. The second connector part is thus formed along at least part of a perimeter of the two-piece block 18 as shown.

The strain adjustment screws 30 are set according to a weight of the service cables plus a preset buffer to account for winds or other natural causes of tension force on the service cables. That is, the weight of the service cables per linear foot is known, and increments of pressure per linear foot of service cable can be determined. In an exemplary embodiment, an additional 15-20% is added to accommodate various causes of tension force on the service cables, and the strain adjustment screws 30 are set accordingly.

In use, in the event that a tree branch or the like imparts a tension force on the service cable that exceeds the predetermined tension force, the service cable is released (pulled away) from the block 18. In this manner, the electrical wire that falls to the ground would be de-energized, thereby preventing a potentially hazardous situation.

FIG. 3 shows an alternative strain release connector that is suitable for securing a service cable for a single house. The connector 116 similarly includes a two-piece block 118 sandwiched over an overhead electrical wire/messenger cable 122. The two pieces of the two-piece block 118 are secured via suitable connectors 124 such as screws or the like. In this embodiment, the second connector part includes a single strain adjustment screw 130 that provides an adjustable holding force on a single service cable 129. The assembly 116 shown in FIG. 3 functions in a similar manner to that of the strain release connector 16 shown in FIGS. 2A and 2B.

In the embodiments of FIGS. 2A, 2B and 3, the block with one or multiple "plugs" will always have the line-side wire in the channel and service cables attached at each or some of the plugs—which will always be on the load side. The block with multiple ports (FIG. 2A), and the block with a single port (FIG. 3) are both installed at "service taps" or "service take-offs" and can replace conventional methods for tapping such as crimping for example. A block with a single "port" for a load side conductor or service cable can serve a typical residence having one service cable going to it (which consists of one neutral and two secondary voltage phases at 120 volts each). The multi-block can be configured with two ports or as many as five on each side. In high-density urban areas, up to four crimped service taps are the conventional maximum, so to have five ports on each side would allow for ten service taps from one location—five on one side of the street, and five on the other.

As described above, the line-side wire that is running pole-to-pole is what will be sandwiched in the groove or channel. It can be the messenger or system neutral, or it can be a "phase" such as in A, B or C phase of energized conductor that travel with the messenger where those phases also have taps to serve customers. (The term overhead electrical wire in the present description is intended to encompass "messenger/neutral or phase" or "messenger/conductor"). These line-side wires can also be considered the "host" wires. The strain release block will be secured to the host wire (messenger/neutral or phase) firmly by four connectors such as bolts, one in each corner (or two connectors for the single block in FIG. 3), in an essentially permanent fashion. The host cable is intended to remain intact and energized. Therefore, where the block is located along the host cable is not significant—its field determined based on where best to tap for the service wire to the houses or buildings.

The load side, or service take-off side, will be torque-adjusted with a screw-down force holding the service wire in its port at a certain tension, so that it will be the load side service cable that breaks away under strain, falling to the ground de-energized. The device is only going to release the service cable(s) that are under strain, and they will become de-energized as they break away.

Figure 4A:
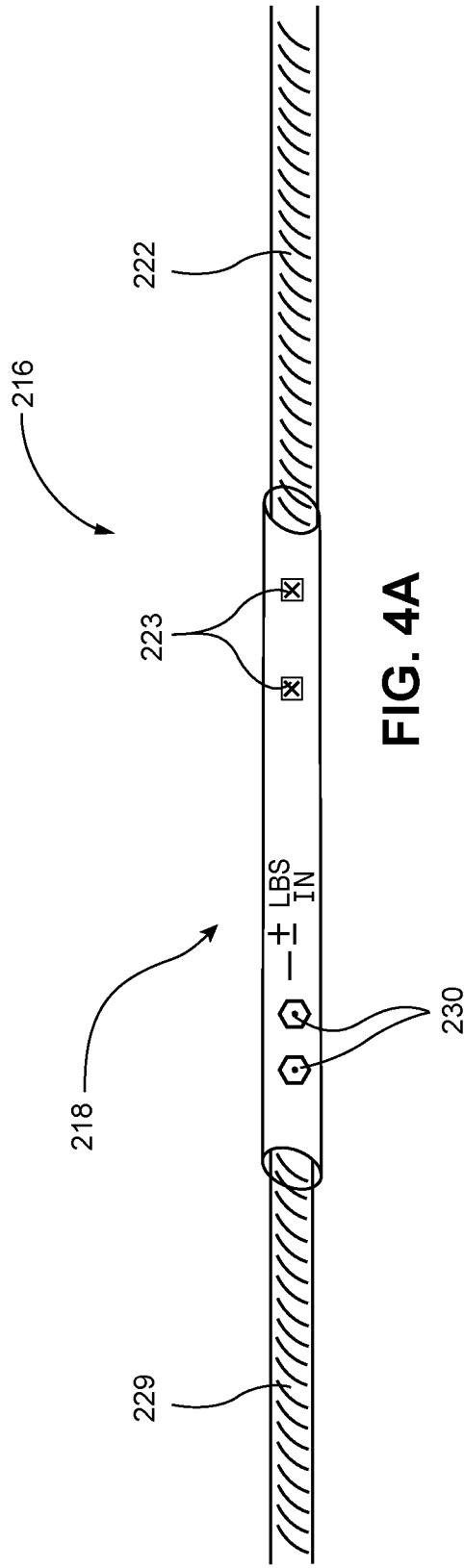
FIGS. 4A and 4B show an in-line strain release connector.

FIG. 4A shows an in-line connector 216 where the first connector part and the second connector part are integrated in opposite ends of a conductor sleeve 218. The first connector part is configured to receive the line side of any wire (overhead electrical wire, messenger cable, or service cable) 222 and includes a crimped section 223 for locking that side of the wire 222 in the sleeve 218. The second connector part is configured to receive and releasably secure the load side of the same wire 229 with the strain adjustment screw 230.

Figure 4B:
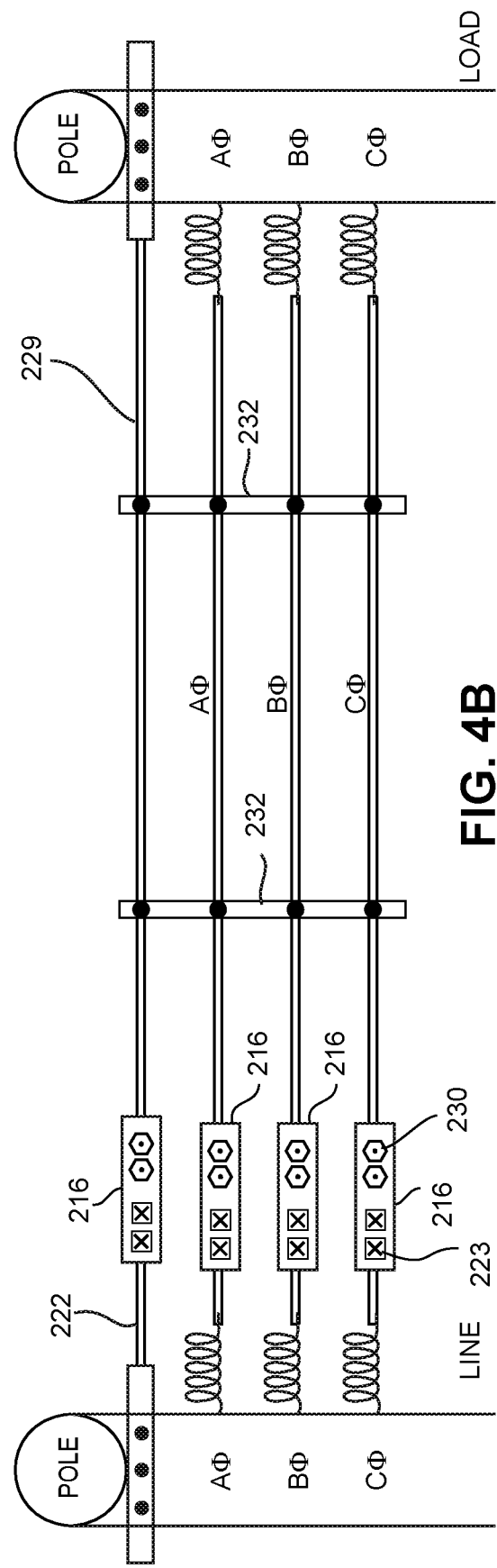

The strain release connector 216 shown in FIGS. 4A and 4B is suitable for high-voltage applications. It can be used on primary open wire conductors, service lash/insulated cables, secondary voltage cables and for all system neutrals and messenger cables. In use, the strain release connector 216 is preferably strategically positioned so that the release point of any energized electrical wire is maintained close enough to the utility pole in the event of breakage to prevent a hazardous situation. For example, the connector 216 may be secured to the overhead electrical wire 222 very close to the pole connection (e.g., 12-24 inches) such that upon release of the load side wire 229, the energized line side of the same wire 222 is short enough to avoid contact with any grounding matter (i.e., other energized wires or pole top equipment or vehicles or people below). The line side will remain in the air, in the clear, and the de-energized load side wire 229 falls to the ground.

The in-line connector will always be installed (like a sleeve) on a single wire (so the terminology herein referring to the wire can be overhead electrical wire-line side and overhead electrical wire-load side, or messenger/neutral or phase—line side, messenger/neutral or phase—load side, or messenger/conductor-load side, messenger/conductor-line side), which can be running pole-to-pole or from pole-to building. (A service cable is still a messenger/conductor). FIG. 4B shows an exemplary pole to pole application used on a primary spacer cable. The line side 222 extends from the pole to the strain release connector 216, and the load side 229 extends to an opposite pole. Spacer brackets 232 hold the phases apart and are held by/suspended off the messenger/neutral conductor above. The primary spacer cable includes three primary high voltage wires identified as phases A-B-C. It may only have one phase being held/suspended off a messenger/neutral conductor above, or may be a phase by itself when the neutral runs below at secondary height.

Figure 5A:
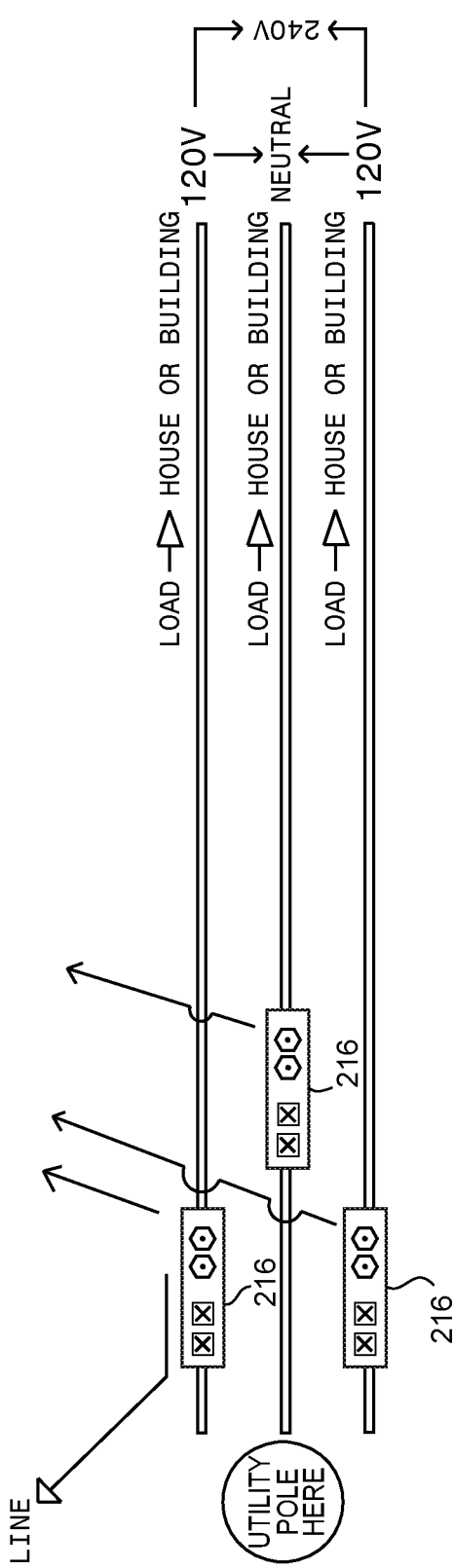
FIGS. 5A and 5B show exemplary applications in an open-wire service.

FIGS. 5A and B show exemplary applications of the in-line strain release connector 216 in an open-wire service where each wire extends from the utility pole to the house or other service location independently (FIG. 5A) and in the same configuration for wires running from pole to pole (FIG. 5B) (instead of pole to house or business) for open wire primary or any size wire up to any voltage in an aerial application.

The blocks or sleeves 18, 118, 218 may be formed of aluminum or copper or another suitable material. In some embodiments, the block may be assembled in two parts, including a top part and a bottom part with bolts on all four corners (or two bolts on opposite sides for the single block 118). The bolts may be torqued sufficiently to make a solid one-piece connection to the running-through host cable. This type of connection also benefits from the size of the block being of sufficient mass/bulk that it will be able to easily conduct any returned/unbalanced currents back to the power system. With the block parts tightly compressing against the host cable, in effect, the mass of the block is intended to become part of the host cable, thereby improving its heat dissipation. Since overheating results from overload, inferior size or loose connections, these aspects are addressed by adding mass via the aluminum or copper block and by the tightly torqued block screw or bolts at all four corners or opposing sides. Additionally, the space allowance (diameter) inside the block for the host cable will be sized slightly inferior to the host cable size to facilitate good contact along the length of the cable within the block, which will prevent any heat buildup.

Figure 5B:
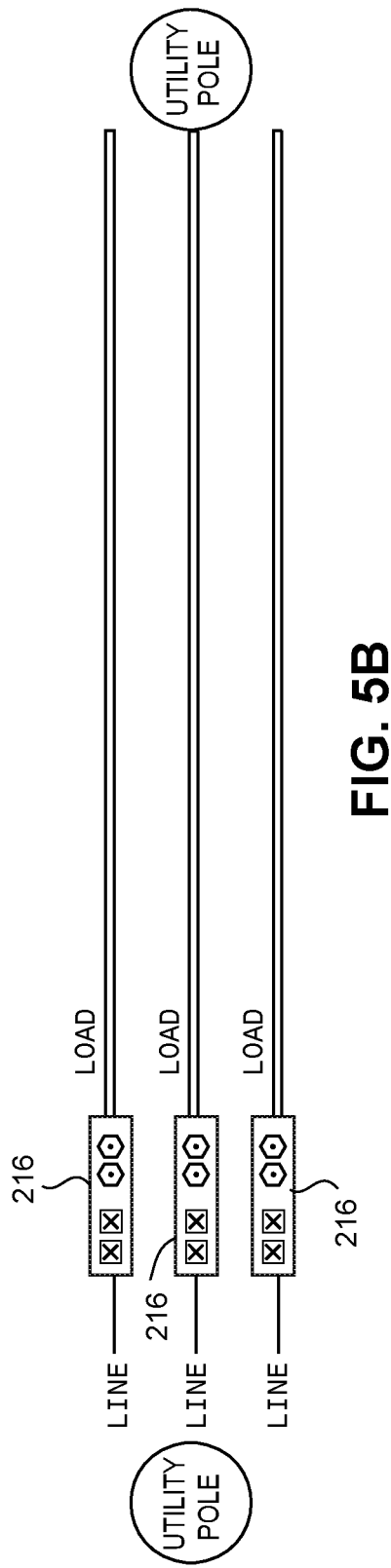

FIGS. 5A and 5B apply in the same configuration for transmission, primary or secondary voltages; any size wire up to any voltage in an aerial or underground application. The in-line connector is highly versatile in its safety applications because it can be installed anywhere along a wire when hazardous conditions warrant; on the main lines, the branch lines, and the service lines. The load side is always the point beyond the release connector device. In an aerial application, the device should be installed 12-24 inches from the line side pole, where it will be crimped on the line side not to break and stay energized with the device still attached, and adjustably-torqued on the load side that is permitted to break/conductively separate and fall away de-energized, where it can be laying on the ground safely. Whenever going over or around sensitive areas such as crossing railroads, highways, school zones, fuel facilities, backyards, over residential properties, or high volume pedestrian areas, parks, wet locations, heavy tree conditions, etc., the need for a downed wire to be able to break away de-energized from its source power is highest. The underground application works in the event of a dig-in, where a backhoe for example can pull on the underground wire, and with enough force will disengage it from the in-line connector thereby de-energizing it and minimizing the hazard sooner than if there were no break-away. Placement is similar to overhead: with the line-side close to the source to de-energize as much of the affected wire as reasonably possible.

The strain release connectors of the described embodiments serve to bridge two pieces of wire/messenger together. Each conductor has its own strain adjustment screw to be released so that the wire can be released accordingly to prevent damage and/or a hazardous situation. This basic design is appropriate to all wire types and sizes commonly utilized by the electric utility industry. The in-line connector (FIG. 4) is crimped into place on its line side (the adjustable tension is on the load side) and due to the crimp on the wire, is not removable. The block strain release connectors (FIGS. 2 and 3) are a clamp; sandwich-bolted at all four corners (or two opposite sides) onto the host wire with a fixed clamping force on the line side (messenger or conductor that fits in the groove or channel) and intended to be mechanically permanent until it is intentionally mechanically moved or removed (the adjustable clamping force is on the load side at the ports for the service cables).

Each product is appropriate to be utilized with every needed cable size such as up to 600 volts for secondary distribution and services as well as any conductor cable carrying more than 600 volts such as for primary distribution and services, transmission circuits, as well as for underground cables of any voltage, including the neutral/messenger cables for each system configuration. The products would be sized appropriate to all typical wire diameters, and with tie-in provisions for wire connections typical to that application.

An objective for these devices is to have each cable's conductors disconnect or come apart at the strain relief point when excessive strain such as from a storm or car-pole accident, etc., is placed on the cable, thereby avoiding or minimizing, localizing, or isolating the extent of damage to adjacent poles or building attachment hardware while enabling the wire to detach from the network de-energized. Placement close to the line-side pole is appropriate for the in-line embodiment. The blocks can be installed where best makes sense for the service taps to be. This safe release will also allow the source (utility power) side of the cable to remain energized and working by keeping it intact, isolated from the fault. These connectors are appropriate to be installed at every service location whether primary or secondary voltage and for every customer type (e.g., industrial, commercial or residential, etc.). These devices improve public safety, utility reliability and preserve property on both sides of the connector.

The load side torque tension (for all devices-block and in-line) should follow the priority order relative to the type of wire it is installed on: conductors (phases) should be secured with less tension to release first; messenger/ground/neutral cables should be secured with more tension to release last. Wire length and material (copper, aluminum, etc.) will factor into its mass weight and corresponding torque-pound increments. The neutral/ground/messenger should release last for the following reasons: it is holding the weight of the energized conductors or service cables under normal conditions, it carries the return current on the network, serves as a ground for faults, lighting strikes, etc., and is important to proper operation of appliances, electronics, and lighting. A principle of this setup is to reassure that the neutral/ground/messenger always goes on/is installed first and will disconnect last, so that no service will have energized conductors without a proper ground/neutral.

Each of the strain release connectors will have an available cap or cover (for the block: hinged with male-female interlock with appropriately coordinated x-shaped pre-scored opening for the wire to be pushed through; and for the in-line: tubular sleeve to match the shape of the in-line connector) for use when using it on energized conductors that protects the entire block from weather, energized contact, and short-circuiting.

In the described embodiments, the exemplary strain release connectors serve to prevent a broken energized wire from reaching the ground. Placement of the in-line connector (FIGS. 4A and 4B) serves to break a running wire (such as from pole-to-pole as part of the utility network) leaving a short energized tail between the connector and the pole. The energized tail remaining on the pole needs to be short enough not to flail around and cause arcing by hitting into other conductors, etc. The blocks (FIGS. 2A, 2B and 3), on the other hand, act as a service take-off, where the device is attached to the wire that runs pole-to-pole, and a service cable is fitted into the cylinder-shaped port on the device in order to supply a customer, where the entire service cable will break away de-energized but the running network wire will remain intact and energized.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A strain release connector for an overhead electrical wire comprising:
   a first connector part securable to the overhead electrical wire with a fixed clamping force; and
   a second connector part cooperable with the first connector part and securable to a service cable with an adjustable clamping force, the second connector part including at least one strain adjustment screw for modifying the adjustable clamping force, wherein the adjustable clamping force is set by the at least one strain adjustment screw such that the second connector part is configured to release the service cable upon an application of a predetermined tension force, the adjustable clamping force being set based on the predetermined tension force,
   wherein the first connector part comprises a two-piece block that sandwiches the overhead electrical wire, the two-piece block being secured by connectors, and wherein the second connector part is formed along at least part of a perimeter of the two-piece block, the second connector part including a plurality of strain adjustment screws respectively securing a corresponding plurality of service cables.

2. The strain release connector according to claim 1, wherein each of the pieces of the two-piece block comprises a groove, the grooves oriented in facing alignment to define an elongated channel, and wherein the overhead electrical wire is securable in the elongated channel.

3. The strain release connector according to claim 1, wherein the second connector part further comprises a plurality of service ports with wire ends therein releasably coupled with the two-piece block and secured by the plurality of strain adjustment screws in direct contact compression on the wire ends.

4. A strain release connector for an overhead electrical wire comprising:
   a first connector part securable to the overhead electrical wire with a fixed clamping force; and
   a second connector part cooperable with the first connector part and securable to a service cable with an adjustable clamping force, the second connector part including at least one strain adjustment screw for modifying the adjustable clamping force, wherein the adjustable clamping force is set by the at least one strain adjustment screw such that the second connector part is configured to release the service cable upon an application of a predetermined tension force, the adjustable clamping force being set based on the predetermined tension force,
   wherein the first connector part comprises a two-piece block that sandwiches the overhead electrical wire, the two-piece block being secured by connectors, and wherein the second connector part is formed along at least part of a perimeter of the two-piece block, the second connector part including a single strain adjustment screw securing a corresponding single service cable.

5. A strain release connector for an overhead electrical wire comprising:
   a first connector part securable to the overhead electrical wire with a fixed clamping force; and
   a second connector part cooperable with the first connector part and securable to a service cable with an adjustable clamping force, the second connector part including at least one strain adjustment screw for modifying the adjustable clamping force, wherein the adjustable clamping force is set by the at least one strain adjustment screw such that the second connector part is configured to release the service cable upon an application of a predetermined tension force,
   wherein the first connector part and the second connector part are integrated in opposite ends of a conductor sleeve.

6. The strain release connector according to claim 5, wherein the first connector part is configured to receive the overhead electrical wire and includes a crimp section for locking the overhead electrical wire therein, and wherein the second connector part is configured to receive and releasably secure the service cable with the strain adjustment screw.

7. An overhead electrical wire assembly comprising:
an electrical pole;
an electric wire secured to the pole;
a service cable connected with the electric wire and coupleable with a service location; and
a strain release connector connected between the electric wire and the service cable, the strain release connector including:
 a first connector part secured to the electric wire with a fixed clamping force; and
 a second connector part cooperable with the first connector part and secured to the service cable with an adjustable clamping force, the second connector part including at least one strain adjustment screw for modifying the adjustable clamping force, wherein the adjustable clamping force is set by the at least one strain adjustment screw such that the second connector part is configured to release the service cable upon an application of a predetermined tension force, the adjustable clamping force being set based on the predetermined tension force,
wherein the service cable comprises a load-side extension of the electric wire, and wherein when the service cable is released upon the application of the predetermined tension force, current in the service cable is disconnected,
wherein the first connector part comprises a two-piece block that sandwiches the overhead electrical wire, the two-piece block being secured by connectors, and wherein the second connector part is formed along at least part of a perimeter of the two-piece block, the second connector part including a plurality of strain adjustment screws respectively securing a corresponding plurality of service cables.

8. The overhead electrical wire assembly according to claim 7, wherein each of the pieces of the two-piece block comprises a groove, the grooves oriented in facing alignment to define an elongated channel, and wherein the overhead electrical wire is secured in the elongated channel.

9. The overhead electrical wire assembly according to claim 7, wherein the second connector part further comprises a plurality of service ports with wire ends therein releasably coupled with the two-piece block and secured by the plurality of strain adjustment screws in direct contact compression on the wire ends.

10. An overhead electrical wire assembly comprising:
an electrical pole;
an electric wire secured to the pole;
a service cable connected with the electric wire and coupleable with a service location; and
a strain release connector connected between the electric wire and the service cable, the strain release connector including:
 a first connector part secured to the electric wire with a fixed clamping force; and
 a second connector part cooperable with the first connector part and secured to the service cable with an adjustable clamping force, the second connector part including at least one strain adjustment screw for modifying the adjustable clamping force, wherein the adjustable clamping force is set by the at least one strain adjustment screw such that the second connector part is configured to release the service cable upon an application of a predetermined tension force, the adjustable clamping force being set based on the predetermined tension force,
wherein the service cable comprises a load-side extension of the electric wire, and wherein when the service cable is released upon the application of the predetermined tension force, current in the service cable is disconnected,
wherein the first connector part comprises a two-piece block that sandwiches the overhead electrical wire, the two-piece block being secured by connectors, and wherein the second connector part is formed along at least part of a perimeter of the two-piece block, the second connector part including a single strain adjustment screw securing a corresponding single service cable.

11. An overhead electrical wire assembly comprising:
an electrical pole;
an electric wire secured to the pole;
a service cable connected with the electric wire and coupleable with a service location; and
a strain release connector connected between the electric wire and the service cable, the strain release connector including:
 a first connector part secured to the electric wire with a fixed clamping force; and
 a second connector part cooperable with the first connector part and secured to the service cable with an adjustable clamping force, the second connector part including at least one strain adjustment screw for modifying the adjustable clamping force, wherein the adjustable clamping force is set by the at least one strain adjustment screw such that the second connector part is configured to release the service cable upon an application of a predetermined tension force, the adjustable clamping force being set based on the predetermined tension force,
wherein the service cable comprises a load-side extension of the electric wire, and wherein when the service cable is released upon the application of the predetermined tension force, current in the service cable is disconnected,
wherein the first connector part and the second connector part are integrated in opposite ends of a conductor sleeve.

12. The overhead electrical wire assembly according to claim 11, wherein the first connector part is configured to receive the overhead electrical wire and includes a crimp section for locking the overhead electrical wire therein, and wherein the second connector part is configured to receive and releasably secure the service cable with the strain adjustment screw.

13. The overhead electrical wire assembly according to claim 11, wherein the electric wire includes the load-side extension and an energized line side, and wherein placement of the strain release connector relative to the electrical pole is such that when the service cable is released upon the application of the predetermined tension force, the energized line side is not ground accessible and is short enough to prevent contact with other grounded pole attachments.

* * * * *